United States Patent [19]

McCugh

[11] 3,913,599

[45] Oct. 21, 1975

[54] COIL SPRING VENTING ARRANGEMENT

[75] Inventor: Ralph M. McCugh, Pittsburgh, Pa.

[73] Assignee: The United States of America as represented by the United States Energy Research and Development Administration, Washington, D.C.

[22] Filed: Sept. 30, 1974

[21] Appl. No.: 510,839

[52] U.S. Cl. ............... 137/1; 137/587; 176/87; 141/84; 137/577; 220/374; 220/375
[51] Int. Cl.² ................................ F16K 24/04
[58] Field of Search .......... 176/87; 137/587, 588, 1, 137/201, 577; 141/84; 220/373, 374

[56] References Cited
UNITED STATES PATENTS

| 1,949,364 | 2/1934 | Ball | 137/577 |
|---|---|---|---|
| 2,368,712 | 2/1945 | Jehle et al. | 137/201 |
| 2,497,181 | 2/1950 | Mikeska | 137/201 |

FOREIGN PATENTS OR APPLICATIONS

| 420,738 | 5/1947 | Italy | 137/577 |
|---|---|---|---|
| 796,736 | 4/1936 | France | 137/588 |

*Primary Examiner*—William R. Cline
*Assistant Examiner*—H. Jay Spiegel
*Attorney, Agent, or Firm*—Dean E. Carlson; Kenneth L. Cage

[57] ABSTRACT

A simple venting device for trapped gas pockets in hydraulic systems is inserted through a small access passages, operated remotely, and removed completely. The device comprises a small diameter, closely wound coil spring which is pushed through guide means which is temporarily inserted in the access passage. The guide has a central passageway which directs the coil spring radially upward into the pocket so that with the guide properly positioned for depth and properly oriented, the coil spring can be pushed up into the top of the pocket to vent the same. By positioning sealing means around the free end of the guide, and using operating means, the spring and guide means are removed and the passage is sealed.

10 Claims, 11 Drawing Figures

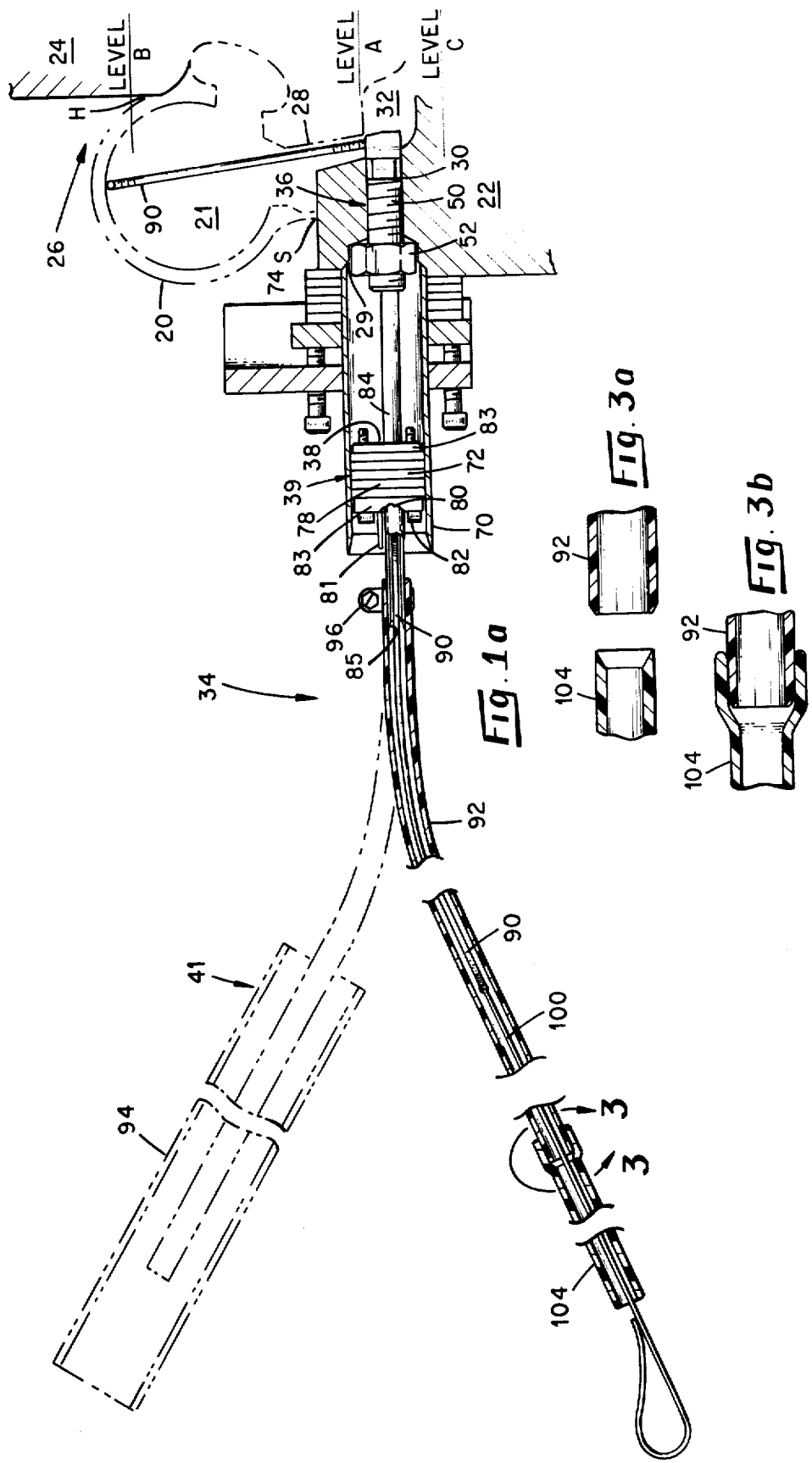

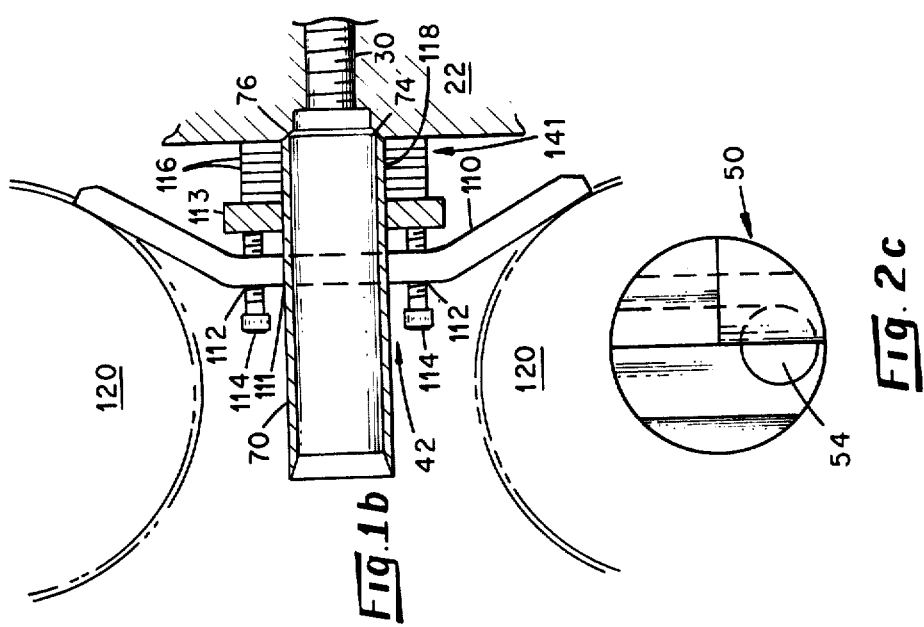
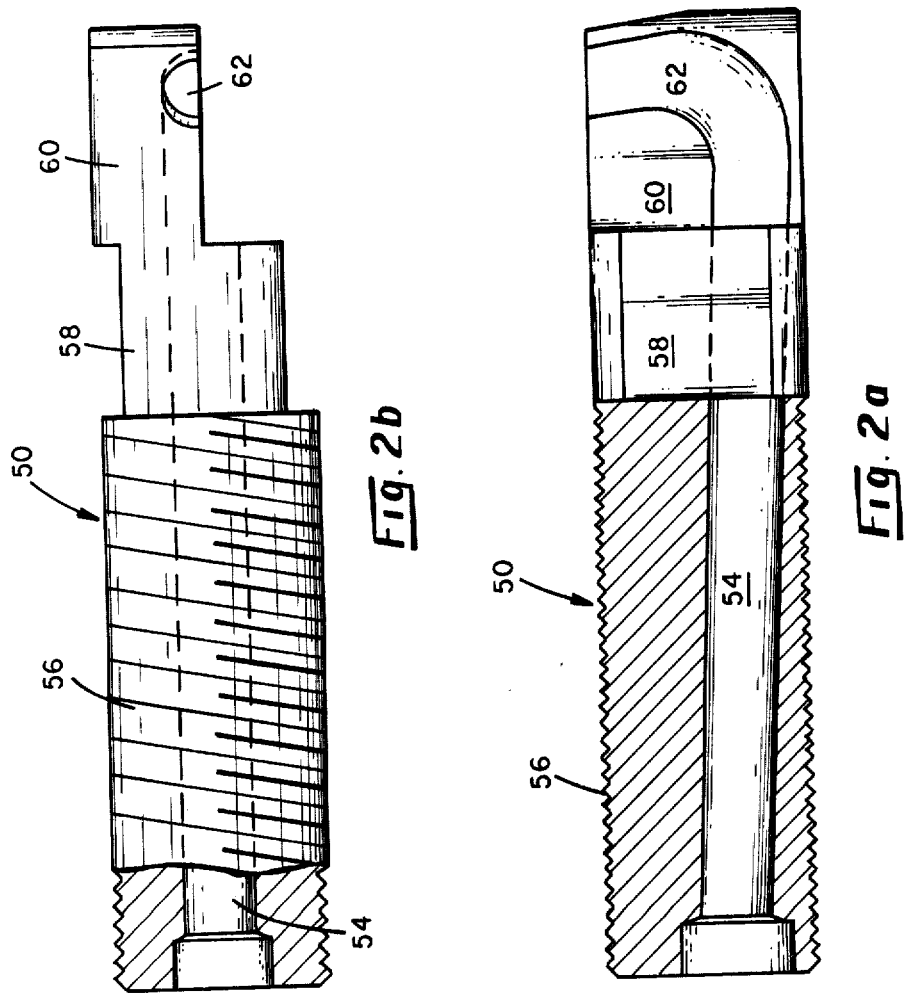

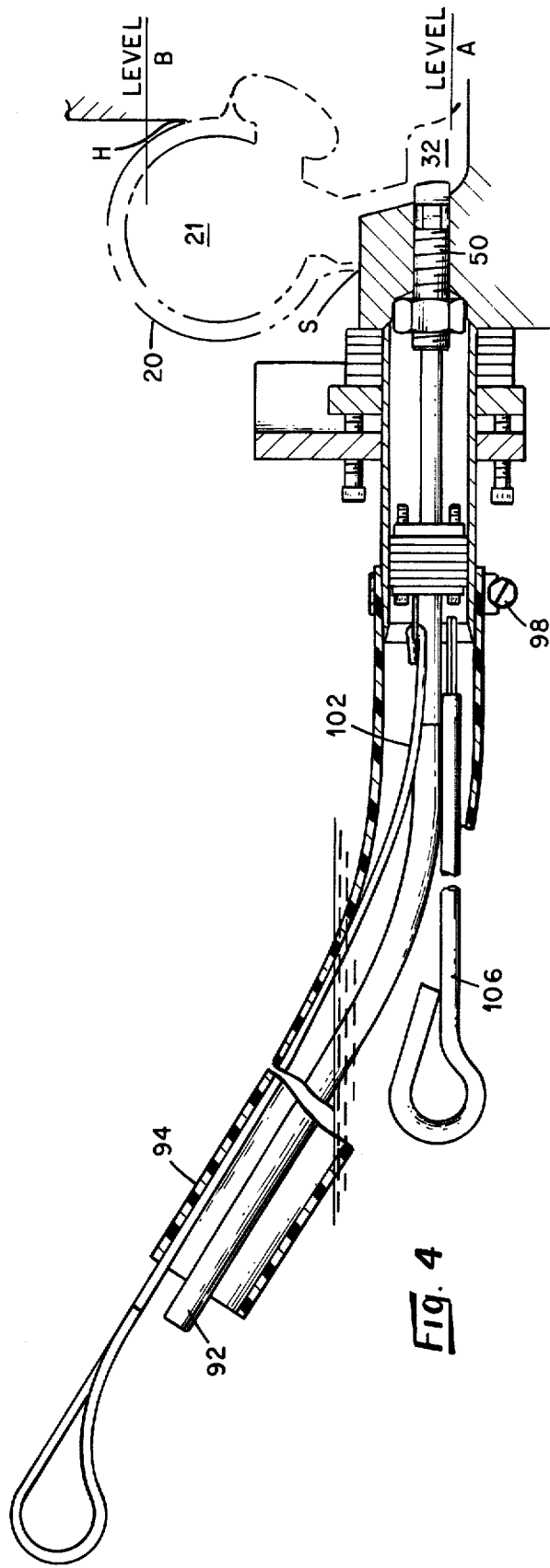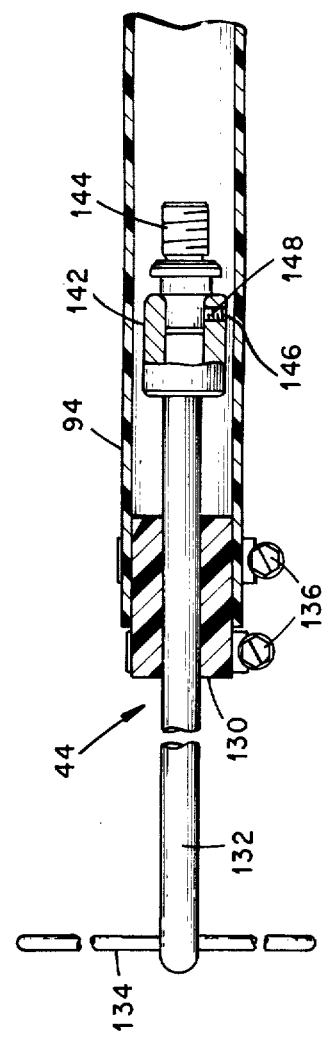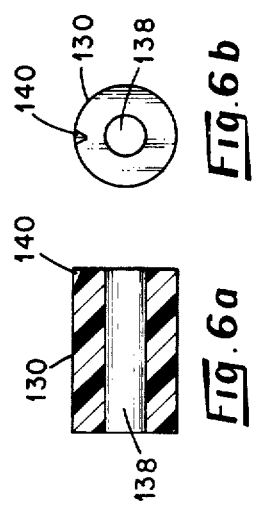

3,913,599

COIL SPRING VENTING ARRANGEMENT

BACKGROUND OF THE INVENTION

The invention described herein was made in the course of, or under, a contract with the United States Atomic Energy Commission.

FIELD OF THE INVENTION

This invention relates to a venting device for a hydraulic system and particularly a hydraulic system where it is necessary or desirable to remove gases which may be trapped in pockets during filling of the system with fluid.

DESCRIPTION OF THE PRIOR ART

It is well known in the art that hydraulic systems during fluid filling have gases which might be trapped in pockets and need to be vented or have the trapped gases removed. This venting may be required to eliminate the compressibility of the gas for positive position of a piston or it may be done to eliminate the chemical reaction of the gas with the fluid or fluid system. Typical prior approaches include U.S. Pat. No. 840,469 issued to C. W. Berry on Jan. 8, 1907 which describes an apparatus in process for filling rubber tires with viscous fluids using a straight rigid tube which is inserted radially upwards for venting. U.S. Pat. No. 1,058,093 issued to W. J. Phelps on Apr. 8, 1913 describes a straight rigid vent tube which is inserted through a hole in the can for venting air from the can as fluid milk flows into the can around the vent tube. U.S. Pat. No. 2,311,901 issued to A. J. Palko on Feb. 23, 1943 uses a small rubber vent tube with the float at the free end for venting tires when filling them with water. However, this rubber vent tube is left in place after the tires are filled. U.S. Pat. No. 2,497,181 issued to P. L. Mikeska on Feb. 14, 1950 describes a venting valve for a steam heating system that employs a helical coil spring siphon tube for conducting the liquid by capillary action along the coils of the tube. U.S. Pat. No. 2,581,914 issued to B. Darrow on Jan. 8, 1952 utilizes a straight rigid vent tube which is slid radially upward through the tire valve stem to a predetermined distance until water overflows the vent tube.

However, the above prior art is not applicable to hydraulic arrangements having fluid cavities with complex geometries or if the upper fluid cavity structure cannot have any openings at the top of the system where gases are trapped. For example, where the gas is trapped in a pocket which cannot be vented directly, when the access passage is severely limited, and where the operation must be formed remotely, none of the existing prior art arrangements will work.

A specific application having a long history of venting or bleeding problems is the venting of an omega seal for a nuclear power reactor. This tubular membrane, sealing a reactor vessel head to a vessel shell, remains filled with air when the vessel is filled with water. The access port level through which the venting is to be accomplished is below the fluid level of the omega seal which creates considerable venting problems. Furthermore, because this venting operation usually takes place during a reactor refueling when the impurities contained in the water may be slightly radioactive, it is necessary to carefully control and collect all drain water. In the present application a coil spring was used as a tube to provide an exit passage for a gas from a remote space having very limited access.

SUMMARY OF THE INVENTION

It is therefore a primary object of this invention to provide a venting device which removes gases which may be trapped in gas pockets during filling of hydraulic systems.

It is a further object of this invention to provide a method of venting complex hydraulic systems having complex geometric shapes.

A further object of this invention is to vent the omega seal of a nuclear power reactor during refueling.

It is a further object of this invention to provide a simple venting device which can be inserted through a small irregular access port, operated remotely, and removed completely.

The present invention provides an apparatus for venting gas trapped in the hydraulic chamber having a defined fluid level, vent passage, vent passage entrance and fluid access passage. The apparatus comprises: means for guiding a spring into said chamber, said guide means disposed to be sealably connected to said vent passage and defining a passageway continuous with said vent passage; inner means and outer means for sealing said guide means passageway to said vent passage and vent passage entrance respectively, said inner and outer sealing means having defined passageways sealably connected to said guide means passageway and vent passage entrance respectively by means for connecting said sealing means to said guide means and vent passage entrance respectively, said outer sealing means surrounding said inner sealing means and having a compressive seal therebetween; each of said inner and outer means defining a movable free end whereby each of said free ends may be positioned above or below said chamber fluid level; a spring having a diameter and wire diameter sufficient to be insertable in a continuous passageway defined by said inner sealing means and guide means passageways whereby trapped chamber gas is vented to the atomsphere from said chamber along the passageway defined by said spring when said inner sealing means is located in a first predetermined position below said chamber fluid level.

The present invention also provides a method of venting gas trapped in a hydraulic chamber having a defined fluid level, vent passage entrance, vent passage, and fluid access passage. The method comprises: placing means for guiding a spring in said vent passage prior to said chamber hydraulic fluid level reaching the level of said vent passage, said guide means sealably connected to said vent passage and defining a passageway continuous with said vent passage; sealably connecting an inner means and outer means to seal said guide means passageway to said vent passage and said vent passage entrance respectively by means for connecting said guide means to said vent passage; said inner and outer sealing means defining passageways continuous with said guide means passageway and said vent passage entrance respectively, said inner and said outer sealing means having a compressive seal spaced therebetween and each of said sealing means having movable free ends whereby each of said free ends may be positioned above and below said chamber fluid level; and venting said chamber by insertion of the spring into said free end of said inner sealing means, said free end of said inner sealing means positioned in a first predetermined position below said hydraulic fluid level, whereby said inner sealing means and guide means directs said spring to said trapped chamber gas to vent the same when said chamber fluid level is above said vent passage.

BRIEF DESCRIPTION OF THE DRAWINGS

FIG. 1a is an elevation view cross section of the present invention disposed to bleed a reactor omega seal.

FIG. 1b is a plan view of the invention of FIG. 1.

FIGS. 2a, 2b, and 2c are plan, elevation and side views respectively of an enlarged view of the spring guide in FIG. 1 with FIGS. 2a & 2b partially in cross section.

FIG. 3a shows the detached ends of the inner sealing means and tube vent attached and FIG. 3b shows the inner sealing means affixed to the tube vent.

FIG. 4 shows the present invention after the coil spring has been removed and the omega seal cavity has been bled.

FIG. 5 shows the closing means of the present invention ready to insert the seal plug.

FIGS. 6a and 6b are respectively longitudinal and transverse cross sections of the closing means.

DESCRIPTION OF THE PREFERRED EMBODIMENT

The inventive venting apparatus and method is particularly adaptable to vent an omega seal for a nuclear power reactor. Although the specific application of an omega seal in a reactor is illustrated, it should be readily apparent the inventive apparatus and method may also be used in hydraulic systems having complex geometries without vent ports at the top, or small, irregular access passages, or a need to be operated remotely.

Referring to FIG. 1a and 1b, an omega seal 20 is positioned between a reactor pressure vessel shell 22 and closure head 24 forming the pressure vessel 26 of the nuclear reactor. The term "omega" seal is derived from the similarity of the cross section of the seal to the greek letter "omega." The seal is welded to the pressure vessel shell 22 at numeral S and to vessel head at numeral H. An access passage or annulus 28 is located near the base of the seal 20 which is connected with external vent passage 30 having a vent passage entrance 29 in shell 22 defining an external pressure release means, and a fluid access passage 32 in shell 22. Passage 28 also serves as a means for the reactor fluid to enter the omega seal chamber 21. As fluid rises to level A from passage 32 inside the reactor shell 22, it begins to enter the omega chamber 21 and closes off the passage 30. As the fluid level increases to level B within the reactor, it is readily seen that venting the compressed air within the chamber creates a considerable problem when the operation must be performed remotely.

The present inventive omega seal venting assembly 34 comprises a means 36 for guiding a spring 90, inner means and outer means 38 and 39 for sealing the passage 28 and passage entrance 29, a means for connecting said sealing means 42 to the chamber vent passage entrance; and a means 44 for closing said chamber vent passage. The guide means 36 comprises a spring guide 50 and a depth positioning nut 52. The spring guide 50, as shown in FIG. 2a, 2b, and 2c, is a generally cylindrical body having circular passageway 54 extending longitudinally therethrough. The outer surface has a plurality of threads 56 to engage the inner surface of the depth positioning nut 52 which sets the innermost position of the spring guide 50. Sealing of the spring guide 50 is accomplished by proper adjustment of the sealing means 38 and 39 and connecting means 42. Passageway 54 extends on one end through a truncated portion 58 of the guide to a vertically oriented hemi-cylinder 60, as shown in FIG. 2b. In portion 60, the passageway 54 is turned at an angle of approximately 8° more than a right angle and comprises one-half of a cylindrical indentation 62 therein. As shown in FIG. 2a the passageway 54 lies in an axis non-parallel to the elevation centerline, but parallel to the plan centerline so that the lowest part of the passage is near portion 58 and hemi-cylinder 60. As indicated, the required insertion depth and position of the spring guide 50 within passage 30 is adjusted by varying the depth positioning nut 52 in a manner so that the elevation axis of the cylindrical indentation 62 is oriented generally parallel to the axis of venting passage 28.

The inner and outer sealing means 38 and 39 comprise respectively a seal tube 70, a guide means extension 84, an inner tube 92 and outer tube 94, hose clamps 96 and 98, cord 100 and 102, compression seal 72, vent tube 104, and wrench 106 are associated components with the sealing means 38 and 39. The seal tube 70 is a cylindrical hollow body having tapered walls 74 to match a tapered wall 76 on vessel shell 22 forming an entrance to access passage 30 and surrounds guide means extension 84. The compression seal 72 is formed of a plurality of grouped flexible discs 78 having central openings 80 therethrough and are fixed together by cap screws 82 connecting spaced apart plates 83 on each end of grouped discs 78 to force and to maintain a seal on the inner and outer wall of tubes 70 and extension 84. A retrieval hook or loop 81 is welded to the outer plate 83 of the compression seal 72. Extending through central opening 80 and into spring guide passageway 54 is guide means extension 84. The edge of the cylindrical extension 84 outside of seal tube 70 has an inwardly tapered shape 85 to facilitate the insertion of spring 90. Clamps 96 and 98 are used to connect tubes 92 and 94 respectively to a free end of guide tube extension 84 and seal tube 70 respectively. One end of each tube 92 and 94 remains free so that it may be positioned or moved above and below the fluid level within said chamber 28.

Spring 90 is a sufficient diameter to fit within guide tube extension 84 and spring guide passageway 54. The spring 90 is designed to be insertable in a passageway defined by said inner operating means, inner sealing means and guide means. As shown in FIG. 3a and 3b as well as FIG. 1a, the inner tube 92 is affixed to vent tube 104 in the manner illustrated.

Referring to FIG. 1b, the positioning means 42 for said inner and outer sealing means 38 and 39, comprises a clamping plate 110 having an opening 111 and 112 which allows passage of seal tube 70 as well as a plurality of cap screws 114 respectively and a bearing plate 113. A seal tube spacer 141 comprises a plurality of flexible discs 116, each having central openings 118 to permit passage of seal tube 70. The clamping plate 110 has a generally concave cross section when viewed in the plan view such that extending legs bear against studs 120 in the pressure vessel shell 22.

Referring to FIG. 5, the means 44 for closing the vent passage 30 comprises a seal tube plug 130, a wrench 132, a key handle 134 for the wrench 132, and a pair of clamps 136. As shown in FIG. 6a and 6b, seal tube plug 130 is a cylindrical body having a concentric opening 138 to allow passage of the free end of wrench 132. A venting notch 140 is formed on one end of plug 130. The key handle 134 fits on the open end of wrench 132 and the opposite end has a socket head 142 to engage seal plug 144. Socket head 142 has a threaded opening 146 which allows screw 148 to positively engage seal plug 144. Clamps 136 position the seal tube plug 130 within outer tube 94 and adjust the fit between wrench 132 and plug 130.

The method of using the aforedescribed apparatus in venting an omega seal 20 of a nuclear reactor can best be understood by reference to all of the drawings and particularly beginning with FIG. 1a and 1b. The present inventive apparatus and method overcomes principal complications in venting omega seals by collecting the drain air-water mixture having possible radioactive contamination in a storage container after venting is completed.

As shown in FIG. 1a, initially the water level in the vessel is below the omega seal passage 28 and shell port 30, as indicated at level C. The clamping plate 110 of positioning group 42 is affixed against the studs 120. The cap screws 114 bear against bearing plate 113, which in turn bears against the plurality of flexible discs 116. Seal tube 70 of the sealing means is inserted through the disc openings 118 to bear against omega seal access passage 32. By adjusting cap screws 114, a seal is formed between the vent passage entrance 29 and seal tube 70.

The spring guide means 50 is inserted into seal tube 70 to the proper depth and sealed therewith. The required insertion depth of spring guide 50 is measured and set by positioning nut 52. The depth of adjusting nut 52 also positions the elevation axis of cylindrical indentation 62 to correspond to the elevation axis of omega seal access passage 32. Nut 52 is seated in a counter sink of omega seal access passage 30.

Compression seal 72 is inserted into seal tube 70 and around guide means extension 84 previously inserted therein and affixed to said guide means passageway 54. The cap screws 82 are tightened by wrench 106 in position. Spring 90 which is attached to guide 50 and to the indentation 62 where it is directed into the omega access passage 28 and up to the top of the omega cavity 21. A convenient spring size is one-eighth of an inch outside diameter of 0.017 inch diameter wire about 18 inches long. A five thirty-seconds outside diameter spring size of 0.02 inch diameter wire is about a maximum spring size to insert and turn in the approximately half-inch access passageway of the spring guide 50.

The cord 100 is passed through the flexible transparent inner tube 92 which is connected by clamp 96 to spring guide tube 84. Tube 92 conducts leakage water to a storage container (not shown) as the water level in the reactor vessel is raised to level A. When clear water flows from tube 21, the venting of the omega seal chamber is complete. Purging with inert gas, bleed and feed or use of chemical additive can be included in the process if desired.

Prior to beginning of removal of the guide means 36 and sealing means, the inner tube 92 is raised above the water level A in the reactor. The spring 90 is removed from the spring guide 50 and inner flexible tube 92 by pulling on cord 100 which is connected to spring 90. The cap screws 82 in compression seal 72 are loosened until seal 72 will slip with a light pull of cord 102 which is attached to retrieval hook 81 which is affixed to the outer compression seal plate 83.

Prior to removing compression seal 72, the outer tube 94 is installed around the inner tube 92 and affixed to seal tube 70, by clamp 98. The outer tube 94 is then partially fueled with water of sufficient quantity to cover seal tube 70. It is noted that the free ends of both the inner and outer tubes 92 and 94 respectively must both be above the water level B in the reactor vessel to avoid leakage. At this time the compression seal 72 and guide tube assembly 50 which are affixed to guide tube extension 84 and inner tube 92 can be removed by pulling on cord 102 as illustrated in FIG. 4.

With the end of the outer tube 94 still above the water level B, the seal tube plug 130 and seal plug 144 are mounted on wrench 132 with wrench 132 extending through sliding seal tube plug 130. The seal tube plug 130 with wrench 132 is loosely inserted into outer tube 94. The free end of tube 94 is lowered until all air is vented at notch 140 of plug 130. The outer tube 94 is lowered to the horizontal position and plug 130 is inserted therein and tightened by clamp 136. Thus, with the flexible tube 94 straightened out and with the free end lowered, the seal plug 144 may be inserted in omega seal access passage 32. The seal tube plug 130 is backed out of tube 94 and lowered to drain the water therein. Clamp screws 114 are loosened and the positioning means 42 is removed.

This invention uses uniquely a tightly coiled spring as a flexible venting tube. The coil spring is particularly effective because of the internal flow capacity of the spring is greater than the combined leak rate of the spring coil and the spring diameter guide means passageway where the point of the spring emerges from the guide. This device has other applications besides venting trapped gases as it can be used to drain liquids from the lower levels by lowering the vent spring and using a blower or compressed gas above to force the liquid through the spring. In this particular application, the novel features is again the use of flexible removable drain.

Thus, it is apparent that there has been provided, in accordance with the invention, an unique method and apparatus utilizing a coil spring venting arrangement to vent the omega seal of a nuclear reactor or for utilization to remove trapped gases in hydraulic systems that fully satisfies the objects, aims, and advantages set forth above. While the invention has been described with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

I claim:

1. In a hydraulic chamber being filled with fluid and having a defined fluid level, vent passage entrance, vent passage, and fluid access passage;

a method of venting trapped gas comprising:

placing means for guiding a spring in said vent passage prior to said chamber hydraulic fluid level reaching the level of said vent passage, said guide means sealably connected to said vent passage and defining a passageway continuous with said vent passage;

sealably connecting an inner means and outer means to seal said guide means passageway to said vent passage and said vent passage entrance respectively by means for connecting said guide means to said vent passage; said inner and outer sealing means defining passageways continuous with said guide means passageway and said vent port entrance respectively, said inner and said outer sealing means having a compressive seal spaced therebetween and each of said sealing means having movable free ends whereby each of said free ends may be positioned above or below said chamber fluid level; and venting said chamber by insertion of the spring into said free end of said inner sealing means, said free end of said inner sealing means positioned in a first predetermined position below said hydraulic fluid level whereby said inner sealing means and guide means directs said spring to said trapped chamber gas to vent the same when said chamber fluid level is above said vent passage.

2. The method in claim 1, additionally including the step of:

maintaining the fluid within the chamber after venting of the same by placing said free end of said inner sealing means in a second predetermined position above said chamber fluid level.

3. The method of claim 1, additionally including the step of:

sealing said outer sealing means by positioning said inner and said outer sealing means free ends in a second predetermined position above said fluid level and inserting additional fluid in said passageways of said inner and said outer sealing means.

4. The method in claim 3, additionally including the step of:

removing said inner sealing means and said guide means from within said outer sealing means and said vent passage respectively and releasing said seal between said inner and outer sealing means and removing the same whereby said additional fluid seals said outer sealing passageway to said vent port entrance.

5. The method in claim 4, additionally including the step of:

inserting means for closing said vent passage within said free end of said outer sealing means whereby said closing means fixedly positions a seal plug in said vent passage.

6. The method defined in claim 5, additionally including the step of:

removing said outer sealing means and said connecting means from said vent passage entrance.

7. In a hydraulic chamber filled with fluid, and having a defined fluid level, vent passage, vent passage entrance and fluid access passage, an apparatus for venting trapped gas comprising:

means for guiding a spring into said chamber, said guide means disposed to be sealably connected to said vent passage and continuous with said vent passage;

inner means and outer means for sealing said guide means passageway to said vent passage and vent passage entrance respectively, said inner and outer sealing means having defined passageways sealably connected to said guide means passageway and vent passage entrance respectively by means for connecting said sealing means to said guide means and vent passage entrance respectively, said outer sealing means surrounding said inner sealing means and having a compressive seal therebetween; each of said inner and outer means defining a movable free end whereby each of said free ends may be positioned above or below said chamber fluid level;

a spring sufficient to be insertable in a continuous passageway defined by said inner sealing means and guide means passageways whereby trapped chamber gas is vented to the atomsphere from said chamber along the passageway defined by spring when said inner sealing means is located in a first predetermined position below said chamber fluid level.

8. The apparatus defined in claim 7, wherein said guide means passageway is defined to radially turn at least 90° within said guide means and terminate in an open-ended generally cylindrical indentation.

9. The apparatus defined in claim 7, wherein said compressive seal comprises a plurality of adjacent flexible discs having openings therein, said discs having means for said discs adjusting to force the outer surface of the said discs into sealable engagement with said outer sealing means and said inner surface of said disc opening into sealable engagement with said inner sealing means.

10. The apparatus defined in claim 7, wherein said inner and outer sealing means comprise respectively cylindrical rigid tubes, transparent flexible tubes, and clamps affixing said flexible tubes to said rigid tubes.

* * * * *